United States Patent [19]

Orthman

[11] 3,870,107
[45] Mar. 11, 1975

[54] TOOL BAR LIFT ASSIST WHEEL
[75] Inventor: Henry K. Orthman, Lexington, Nebr.
[73] Assignee: Orthman Manufacturing, Inc., Lexington, Nebr.
[22] Filed: June 11, 1973
[21] Appl. No.: 368,955

[52] U.S. Cl. ............................. 172/413, 172/421
[51] Int. Cl. ........................................... A01b 63/22
[58] Field of Search .......... 172/395, 407, 413, 423, 172/705, 710, 261, 264, 265, 224, 491, 451, 414, 238, 424, 421, 397

[56] References Cited
UNITED STATES PATENTS

| | | | |
|---|---|---|---|
| 3,042,122 | 7/1962 | Anderson | 172/265 |
| 3,065,803 | 11/1962 | Pierson | 172/413 |
| 3,077,231 | 2/1963 | Hamilton | 172/451 UX |
| 3,321,031 | 5/1967 | Evans | 172/705 X |
| 3,515,219 | 6/1970 | Jackson | 172/413 X |
| 3,539,018 | 11/1970 | Sprenkel | 172/491 X |
| 3,599,728 | 8/1971 | Moe et al. | 172/265 |
| 3,643,745 | 2/1972 | Betulius et al. | 172/413 |

Primary Examiner—Stephen C. Pellegrino
Attorney, Agent, or Firm—Zarley, Mckee, Thomte & Voorhees

[57] ABSTRACT

A tool bar adapted to carry ground-working tools is carried on the three-point hitch of a tractor and the weight of the tool bar and ground-working tools is in part supported by one or more lift assist wheels extending rearwardly of the tool bar. The wheels are carried on the lower ends of arms pivotally connected to the tool bar and a power cylinder extends from the tool bar to an upstanding post on the arm. An accumulator cylinder positioned on the arm receives fluid from one side of the piston in the power cylinder. A piston in the accumulator is yieldable under a selective pressure applied thereto such that a predetermined upward force on the lift wheel arm causes oil from the power cylinder to flow into the accumulator and then return after the force on the arm has been removed. A telescopic adjustment member extends between the upstanding pivotal post to the arm for selectively setting the power cylinder for the given conditions. Depth control wheels are provided on the forward side of the tool bar.

9 Claims, 4 Drawing Figures

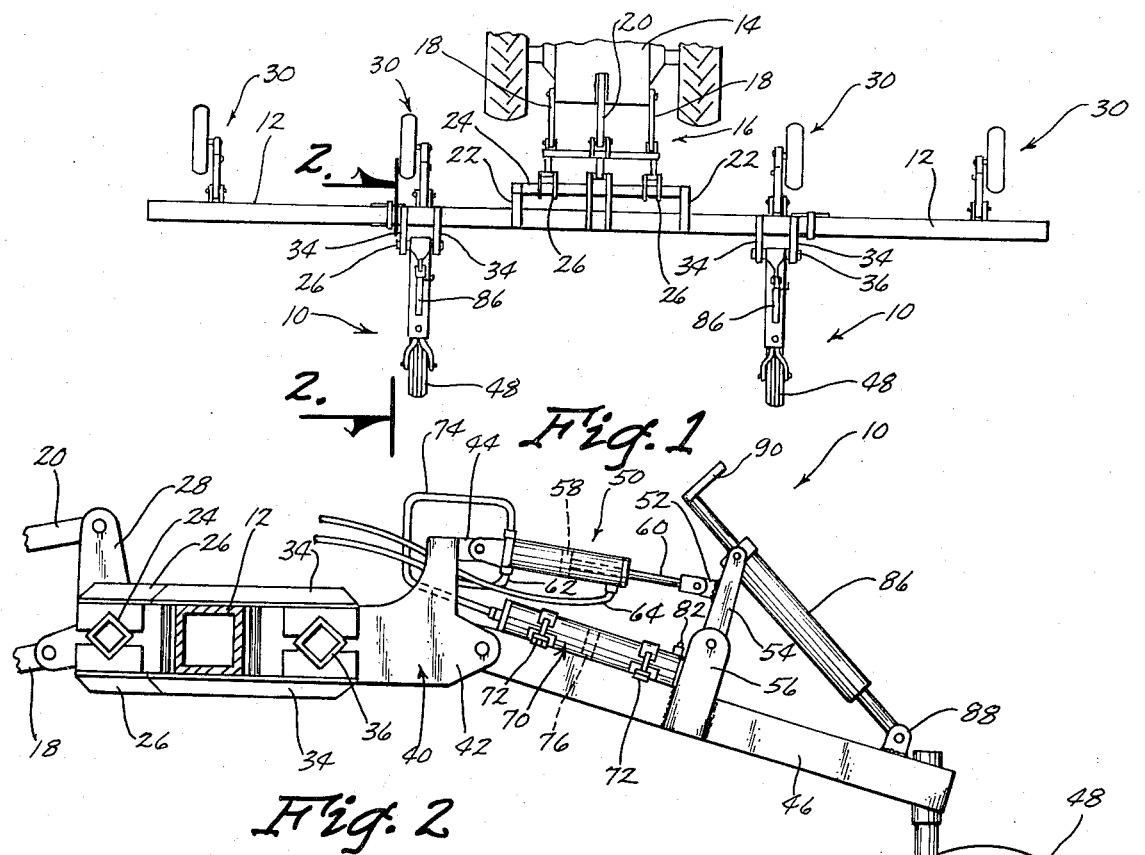
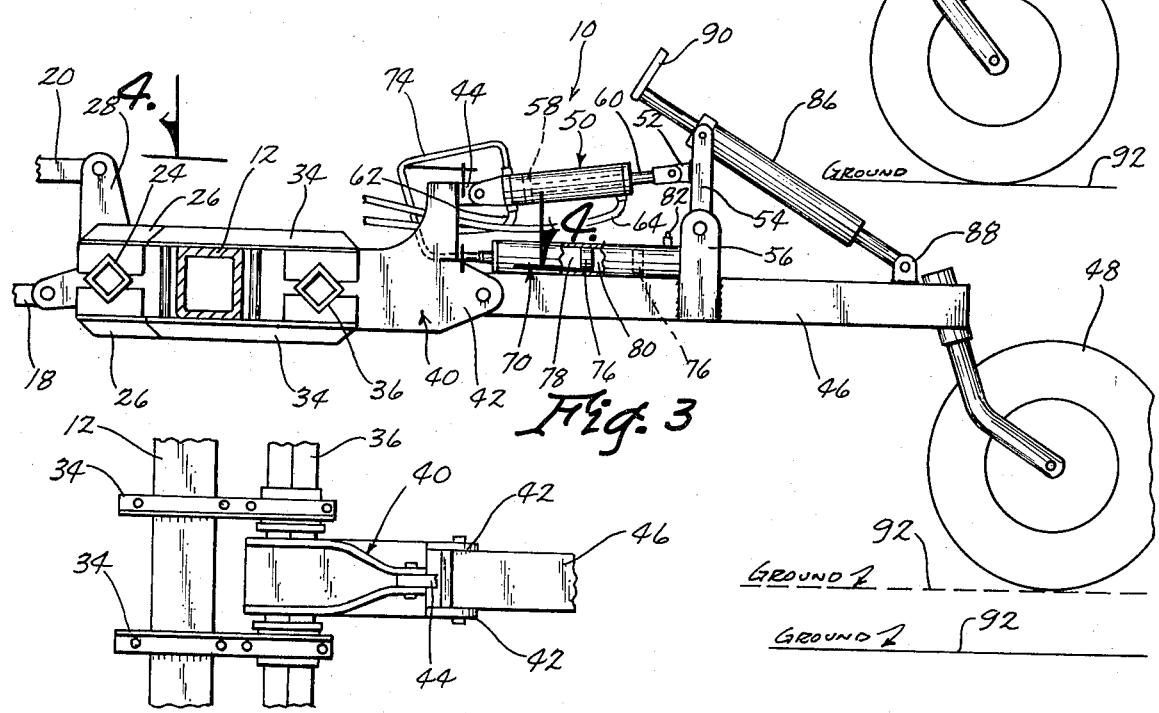

TOOL BAR LIFT ASSIST WHEEL

A tool bar carried on the three-point hitch of a tractor is convenient to operate and control. Additionally, hitching a tool bar to the tractor is simplified through the use of the three-point hitch which functions not only to raise and lower the tool bar but also to pull the implement mounted on the tool bar. Depth control wheels are conventionally provided on the tool bar to limit the depth of the working tools.

One of the problems with larger tool bars and large tractors is that severe strains are put on the hydraulic equipment associated with the three-point hitch. This is particularly true when traveling over uneven ground since if the tractor drops into a depression the hitch arms through the lift assist wheel will be called upon to support the tractor thereby placing unreasonable damaging loads on the three-point hitch system. It is appreciated, of course, that the hydraulic circuitry for the three-point hitch in effect becomes a solid rigid linkage and the same is true for any hydraulic equipment used to raise and lower the lift-assist wheel. Accordingly, if everything is substantially rigid then when the tractor falls into a depression damage is likely to result due to the severe strain placed on the equipment not designed to handle such loads.

The lift-assist wheel of this invention will overcome these problems by the fact that it includes an accumulator to receive oil from the hydraulic power cylinder operating the lift-wheel arm such that when unusual forces are applied upwardly on the lift arm the oil in the power cylinder will leave the power cylinder and be accepted by the accumulator cylinder. When the forces on the lift-assist wheel are removed by the tractor moving out of a depression or the like, the oil will then return to the power cylinder from the accumulator. The accumulator can be adjusted to provide the desired resistance to oil entering it. It has been found that gas which is compressible functions as a desirable cushion in the accumulator since its initial resistance is small and increases as the load increases. Dry nitrogen gas is preferred.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a top plan view of a tool bar mounted on a three-point hitch of a tractor and further showing a pair of lift-assist wheels extending rearwardly from the tool bar.

FIG. 2 is an enlarged cross sectional view taken along line 2 — 2 in FIG. 1 showing in particular the lift-assist arms and wheels secured to the tool bar.

FIG. 3 is a view similar to FIG. 2 but showing the lift-assist arms in a raised position.

FIG. 4 is a fragmentary top plan view taken along line 4 — 4 in FIG. 3.

The lift-assist wheel structure of this invention is referred to generally in FIG. 1 by the reference numeral 10 and is shown carried on a tool bar 12 in turn supported on a tractor 14 through the three-point hitch 16.

The conventional structure of the three-point hitch includes a pair of lift arms 18 and a stabilizer arm 20. Forwardly extending spaced apart brackets 22 are provided on the tool bar 12 and engage a cross member 24 at its opposite ends. A pair of brackets 26 on the cross member 24 are provided for engagement with the lift arms 18. An upstanding post 28 on the cross member 24 is connected to the stabilizer arm 20. The three-point hitch is designed to operate in a conventional manner.

Extending forwardly from the tool bar are depth control wheel assemblies 30. The lift-assist wheel assembly 10 is connected separately to the tool bar and extends rearwardly. In FIG. 4 it is seen that a pair of clamp-type brackets 34 are provided for engagement with the tool bar 12 at their forward ends and engage a cross member 36 at their rear ends. A mounting bracket 40 is rigidly connected to the cross member 36 and includes a rearwardly extending ear 42 and an upwardly positioned ear 44. A rearwardly extending arm 46 is pivotally connected to the ear 42 and includes a caster-type wheel 48 at its end. A double-acting hydraulic cylinder 50 is pivotally connected to the ear 44 and extends rearwardly for connection to an ear 52 on a pivotal post 54 pivotally connected to an ear 56 on the arm 46. The cylinder 50 includes a piston 58 having a piston rod 60 in turn connected to the ear 52. A pair of hydraulic lines 62 and 64 communicate with cylinder chambers on opposite sides of the piston 58.

An accumulator cylinder 70 is secured to the arm 46 by clamps 72 and includes a hydraulic line 74 in communication jointly with the hydraulic line 62 connected to the power cylinder 50. The accumulator cylinder includes a piston 76 having chambers 78 and 80 on opposite sides thereof. The chamber 80 as shown holds gas introduced therein through a valve 82 while the chamber 78 is designed to receive oil from the power cylinder 50 upon the fluid pressure reaching a predetermined level sufficient to move the piston 76 towards the right against the resistance offered by the compressed gas in the chamber 80.

The upstanding post 54 connected to the piston rod 60 may be selectively adjusted to provide the desired angle and position for the piston 58 by a telescopic adjustment member 86 pivotally connected to the post 54 and to an ear 88 on the arm 46 adjacent the wheel 48. A handle control 90 is provided for manually extending and retracting the adjustment member 86 for pivoting the upstanding post 54.

Thus in operation it is seen that the tool bar having any desired working tools thereon (not shown) will be positioned on level ground such that the lift-assist wheel 48 is engaging the ground 92, as seen in FIG. 2, and the pistons 58 in the power cylinder 50 and 76 in the accumulator cylinder 70 are generally centrally located. Now hydraulic fluid fed into the hydraulic line 64 will cause the arm 46 to be raised to the dash-line ground position 92' of FIG. 3 thereby moving the piston 58 to the left as seen. Since no unusal forces are being applied to the hydraulic circuitry the accumulator piston 76 will remain in the same position. The pressure in the accumulator chamber 88 will have been set at the desired level to allow the piston 76 to move to the right only when damaging stresses are being approached. Thus, if the lift-assist wheel 48 should hit an obstruction symbolized by the dash-line representation of the ground 92' in FIG. 3, or if the tractor should drop into a depression in effect causing the lift-assist wheel 48 to be forced upwardly, the force through the piston rod 60 to the piston 58 will cause oil to be fed from the left side of the power cylinder piston into the line 74 and thus into the chamber 78 of the accumulator 70 thereby forcing the piston 76 to the right against the compressed air in the chamber 88. Upon the wheel 48 moving off of the obstruction or the tractor moving out of a depression, the stresses on the hydraulic circuitry will have been removed and thus the compressed air in the chamber 88 will force the piston 76 to the left and cause the oil to be returned through the line 74 to the power cylinder 50. Thus it is seen that through use of the accumulator the otherwise rigid hydraulic circuitry has become yieldable to allow the lift-assist arm 46 to pivot upwardly when a predetermined upward force is applied to it through the wheel 48. It is further seen that the lift-assist wheel assembly may be readily applied to any tool bar and any number of lift-assist wheels may be used as required. During transport the lift-assist wheel assemblies will be raised off the ground and in the position of FIG. 3.

I claim:

1. A tool bar assembly comprising,
an elongated tool bar,
hitch means connected to said tool bar,
ground working tools on said tool bar,
a rearwardly extending arm pivotally connected to said tool bar and a ground-engaging wheel means on the lower end of said arm,
a hydraulic power cylinder operatively connected between said tool bar and said arm for raising and lowering said arm,
a hydraulic accumulator connected to said power cylinder to receive fluid from said power cylinder when a predetermined upward force is applied to said arm and return said fluid upon said force being removed to relieve strain on the power cylinder and associated hydraulic equipment,
said accumulator including a cylinder, a piston movable in said cylinder, a yieldable pressure means for selectively applying pressure to one side of said piston, and said power cylinder being connected to the cylinder of said accumulator on the other side of said piston whereby fluid introduced into said cylinder is opposed by said pressure means,
adjustment means being provided for varying the point along said arm where said power cylinder is connected to said arm,
said power cylinder being connected at one end to said arm through a post pivotally connected to said arm and said adjustment means is an extendable member connected to and between said post and said arm whereby adjustment of said adjustment means, pivots said post.

2. A tool bar assembly comprising,
an elongated tool bar,
hitch means connected to said tool bar,
ground working tools on said tool bar,
a plurality of forwardly extending depth control wheels secured to said tool bar,
means for moving said depth control wheels relative to said tool bar so that the vertical position of said ground working tools may be selectively varied,
a rearwardly extending arm pivotally connected to said tool bar and a ground-engaging wheel means on the lower end of said arm,
a hydraulic power cylinder operatively connected between said tool bar and said arm for raising and lowering said arm,
a hydraulic accumulator connected to said power cylinder to receive fluid from said power cylinder when a predetermined upward force is applied to said arm and return said fluid upon said force being removed to relieve strain on the power cylinder and associated hydraulic equipment,
said hitch means comprising a three-point hitch including means for connection to a prime mover.

3. The structure of claim 2 wherein said three-point hitch includes a pair of brackets on said tool bar for connection to lift arms on the prime mover and an upstanding post for connection to a stabilizer arm on the prime mover.

4. The structure of claim 1 wherein said accumulator includes a cylinder, a piston movable in said cylinder, a yieldable pressure means for selectively applying pressure to one side of said piston, and said power cylinder being connected to the cylinder of said accumulator on the other side of said piston whereby fluid introduced into said cylinder is opposed by said pressure means.

5. The structure of claim 4 wherein said power cylinder is of the double-acting type including a piston movable in a cylinder and said piston having a rod being connected to said arm, hydraulic lines being connected to said power cylinder on opposite sides of said piston with said accumulator being connected thereto on the side opposite said piston rod.

6. The structure of claim 5 wherein said yieldable pressure means is further defined as being gas in said accumulator cylinder on said one side of said piston.

7. The structure of claim 6 wherein a valve means is provided in communication with said one side of said piston in said cylinder of said accumulator for selectively introducing and removing gas into and from said cylinder.

8. The structure of claim 4 wherein adjustment means is provided for varying the point along said arm where said power cylinder is connected to said arm.

9. The structure of claim 4 wherein said accumulator is secured to said rearwardly extending arm.

* * * * *